(12) United States Patent
Lin (10) Patent No.: US 8,243,361 B2
(45) Date of Patent: Aug. 14, 2012

(54) ELECTROPHORETIC DISPLAY APPARATUS AND METHOD OF MANUFACTURING THE SAME

(75) Inventor: Yu-Ting Lin, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 291 days.

(21) Appl. No.: 12/833,206

(22) Filed: Jul. 9, 2010

(65) Prior Publication Data
US 2011/0242640 A1   Oct. 6, 2011

(30) Foreign Application Priority Data
Apr. 1, 2010  (TW) ................ 99110197 A (51) Int. Cl.
*G02B 26/00* (2006.01)
(52) U.S. Cl. ............. 359/296; 345/84; 345/107
(58) Field of Classification Search ............ 359/296; 345/84, 107
See application file for complete search history.

(56) References Cited

U.S. PATENT DOCUMENTS

| | | | |
|---|---|---|---|
| 7,218,048 B2* | 5/2007 | Choi et al. ............... | 345/84 |
| 2005/0194657 A1 | 9/2005 | Koide | |
| 2007/0146307 A1* | 6/2007 | Kuo et al. ............... | 345/107 |
| 2009/0225064 A1 | 9/2009 | Sah | |
| 2009/0237392 A1* | 9/2009 | Kajino ..................... | 345/107 |

FOREIGN PATENT DOCUMENTS

| | | |
|---|---|---|
| JP | 2008-077332 A | 4/2008 |
| TW | 1311217 | 7/2009 |

OTHER PUBLICATIONS

English language translation of abstract of TW 1311217 (Published Jul. 21, 2009).
English language translation of abstract of JP 2008-077332A (Published Apr. 3, 2008).

* cited by examiner

*Primary Examiner* — Evelyn A. Lester
(74) *Attorney, Agent, or Firm* — Thomas, Kayden, Horstemeyer & Risley, LLP (57) ABSTRACT

An electrophoretic display apparatus and a method of manufacturing the same are provided. The electrophoretic display apparatus includes a driving substrate, an electrophoretic display panel disposed on the driving substrate, a controller disposed on the driving substrate, and a conductive element. The electrophoretic display panel comprises a peripheral region and a display region, and the display region is positioned between the controller and the peripheral region. The first conductive element is disposed in the peripheral region, and electrically connected the controller and the electrophoretic display panel.

18 Claims, 6 Drawing Sheets

ELECTROPHORETIC DISPLAY APPARATUS AND METHOD OF MANUFACTURING THE SAME

RELATED APPLICATIONS

This application claims priority to Taiwan Application Serial Number 99110197, filed Apr. 1, 2010, which is herein incorporated by reference.

BACKGROUND

1. Technical Field

The present invention relates to a display apparatus, more particularly to an electrophoretic display apparatus and a method of manufacturing the same.

2. Description of Related Art

Since a normal flat display device in volume and weight is much greater than a piece of printed paper in volume and weight, the printed paper which is easy to carry and read is better than the normal flat display device. In view of that, an electrophoretic display apparatus (EPD apparatus) using electrophoretic materials is provided in the market in which the EPD apparatus is not only easy to carry and read as the printed paper is, but also works on information process with high effectiveness and low pollution production as a computed device does.

Figure 1:
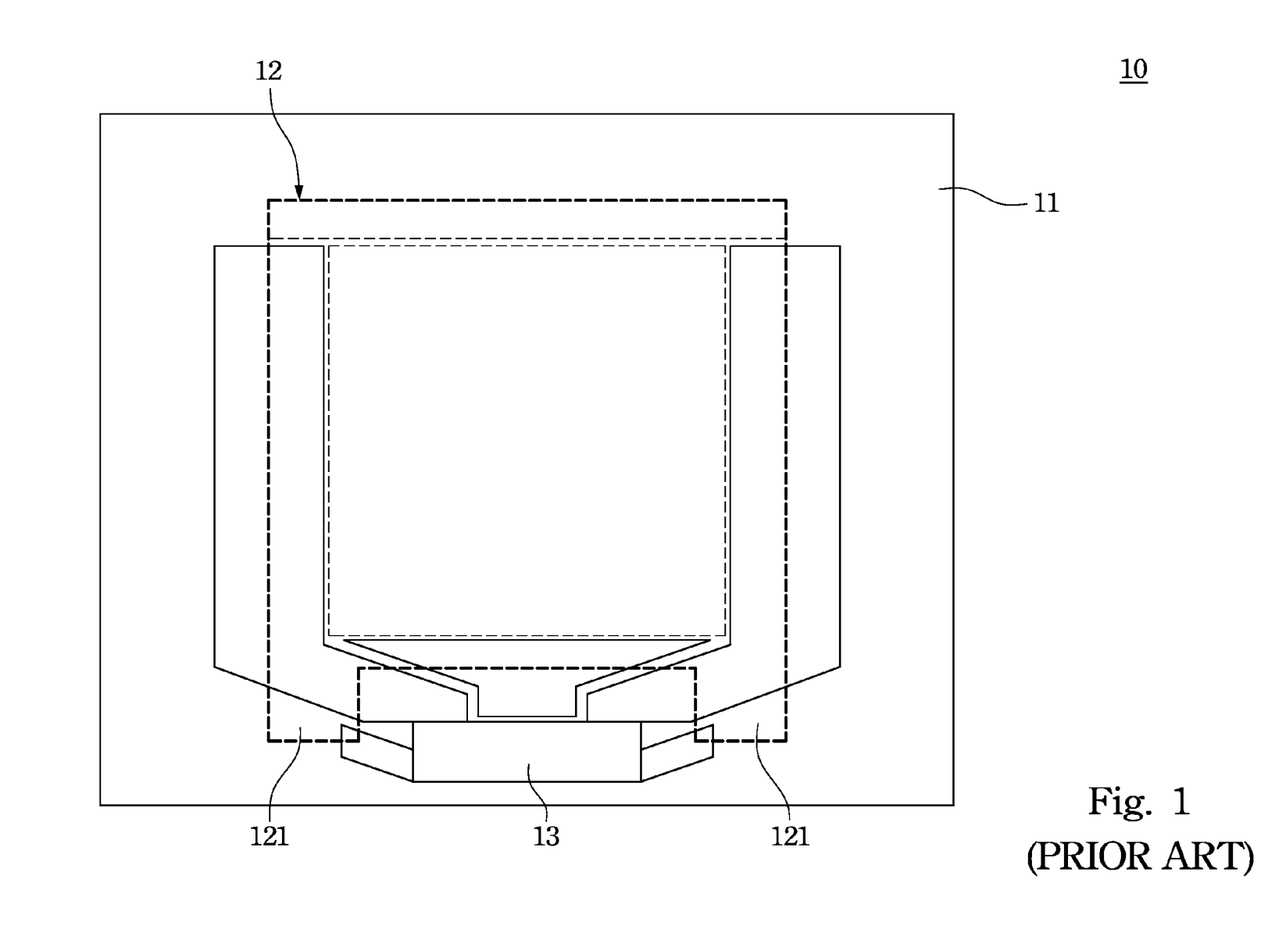
FIG. 1 illustrates a top schematic view of a conventional electrophoretic display apparatus.

Refer to FIG. 1. FIG. 1 is a schematic view of a conventional electrophoretic display apparatus. The conventional electrophoretic display apparatus 10 includes a driving substrate 11, an electrophoretic display panel 12 and a controller 13. Both the electrophoretic display panel 12 and the controller 13 are disposed on the driving substrate 11, and the electrophoretic display panel 12 is arranged on one side of the controller 13.

However, since the electrophoretic display panel 12 is made by an upstream production maker, and then the electrophoretic display panel 12 is delivered to a downstream module maker or system maker to assemble the electrophoretic display panel 12 and the controller 13 on the driving substrate 11. In order to electrically connect the electrophoretic display panel 12 and the controller 13, when cutting a large electrophoresis display panel material into a plurality of small pieces of the electrophoretic display panels 12, each electrophoretic display panel 12 will be left two protrusion areas 121 thereon on purpose. Thus, when the electrophoretic display panel 12 is installed on the driving substrate 11, the two protrusion areas 121 can be provided to electrically connect with the controller 13.

Since the two protrusion areas 121 of the electrophoretic display panel 12 are left with the electrophoretic display panel 12 purposely, the areas between every two protrusion areas 121 on the rest of the electrophoretic display panel material are therefore useless or wasted. Consequently, when the electrophoretic display panel material is cut, the material utilization ratio thereof will be decreased obviously, and the material cost 12 is thereof increased as well.

Furthermore, since a size of an electrophoretic display apparatus (e.g. e-book) is getting small recently, the wasting ratio of the electrophoretic display panel material will be relatively increased.

Therefore, how to develop an electrophoretic display apparatus capable of solving the mentioned disadvantages and inconveniences shall be a serious issue for the related industries to concern immediately.

SUMMARY

One object of the present invention is to provide an electrophoretic display apparatus and a method of manufacturing the same to downsize the electrophoretic display panel of the electrophoretic display apparatus, and further increase the material utilization ratio after the electrophoretic display panel material is cut.

An aspect of the invention provides an electrophoretic display apparatus including a driving substrate, an electrophoretic display panel, a controller and a conductive element. The driving substrate includes an effective display area and a plurality of pixel electrodes disposed within the effective display area. The electrophoretic display panel is disposed over the pixel electrodes of the driving substrate in which the electrophoretic display panel includes a peripheral region and a display region. The controller is disposed on the driving substrate in which the controller is positioned at a side opposite to the peripheral region of the electrophoresis display panel, and the display region is positioned between the controller and the peripheral region of the electrophoretic display panel. The first conductive element is disposed in the peripheral region of the electrophoretic display panel, and electrically connected the controller and the electrophoretic display panel.

Another aspect of the invention provides a method for manufacturing an electrophoretic display apparatus. The method for manufacturing an electrophoretic display apparatus includes a step of providing an electrophoretic display panel having a peripheral region thereon, wherein the electrophoretic display panel includes an upper substrate, a conductive electrode disposed on the upper substrate, a plurality of cups respectively disposed on the conductive electrode, an electrophoretic display material disposed in the cups, and an adhesive layer disposed on the cups to seal the electrophoretic display material; a step of providing a driving substrate, wherein the driving substrate includes a conductive pad corresponding to the peripheral region of the electrophoretic display panel; a step of installing a controller on the driving substrate, wherein the controller is positioned at a side opposite to the peripheral region of the electrophoresis display panel, and electrically connected to the conductive pad; a step of forming a conductive area on the peripheral region of the electrophoresis display panel, which is corresponding to the conductive pad and is exposed a part of the conductive electrode; a step of providing a conductive element in the conductive area; and a step of combining the electrophoretic display panel and the driving substrate together that the conductive element is electrically connected with the conductive pad and the electrophoretic display panel.

To sum up, the present invention saves materials of the two protrusion areas and the area between the two protrusion areas of the conventional electrophoretic display panel material mentioned above, so as not only to increase the material utilization ratio after the electrophoretic display panel material is cut, but also prevent from rising the material cost.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present invention provides an electrophoretic display apparatus and a method of manufacturing the same.

Figure 2A:
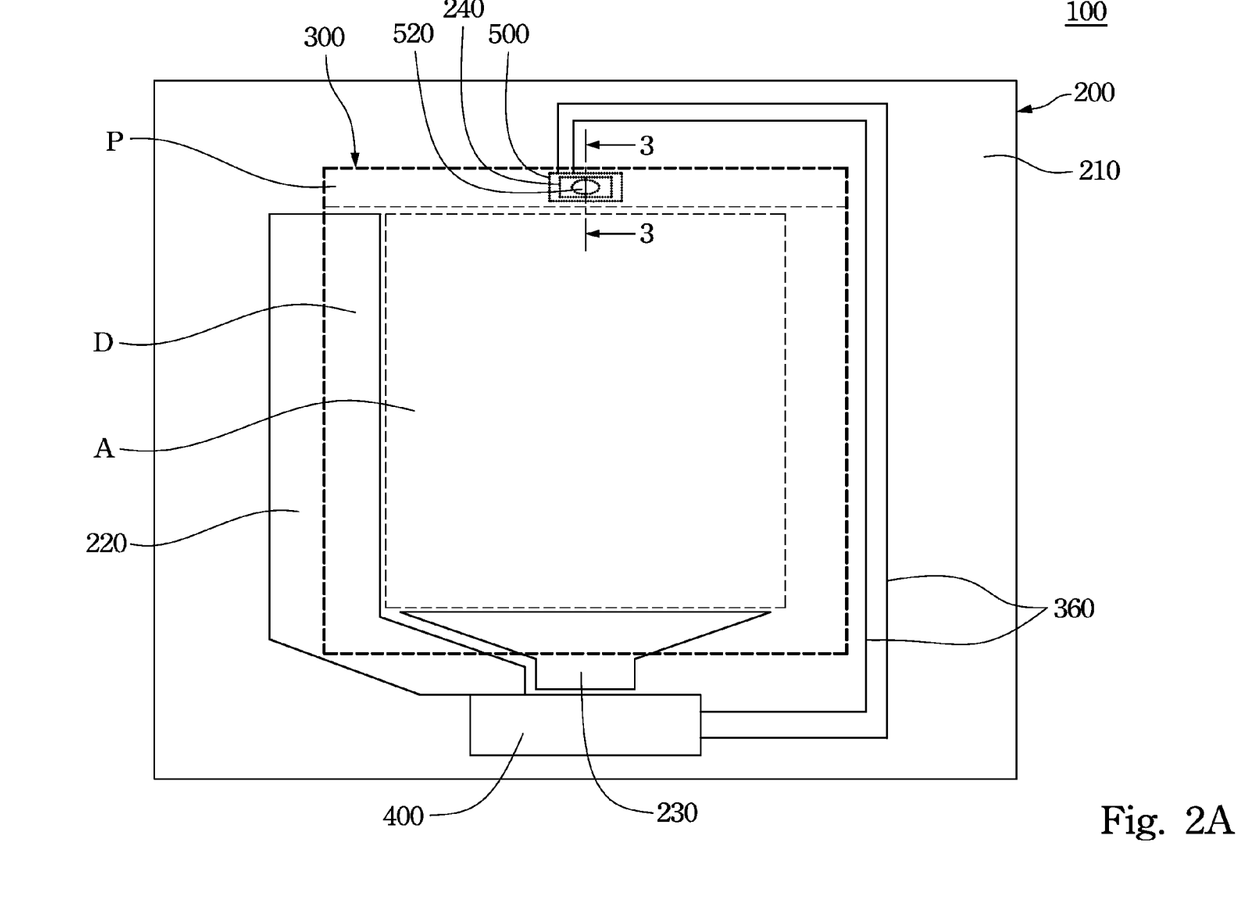
FIG. 2A illustrates a top schematic view of an electrophoretic display apparatus of one embodiment of the present invention.
Figure 2B:
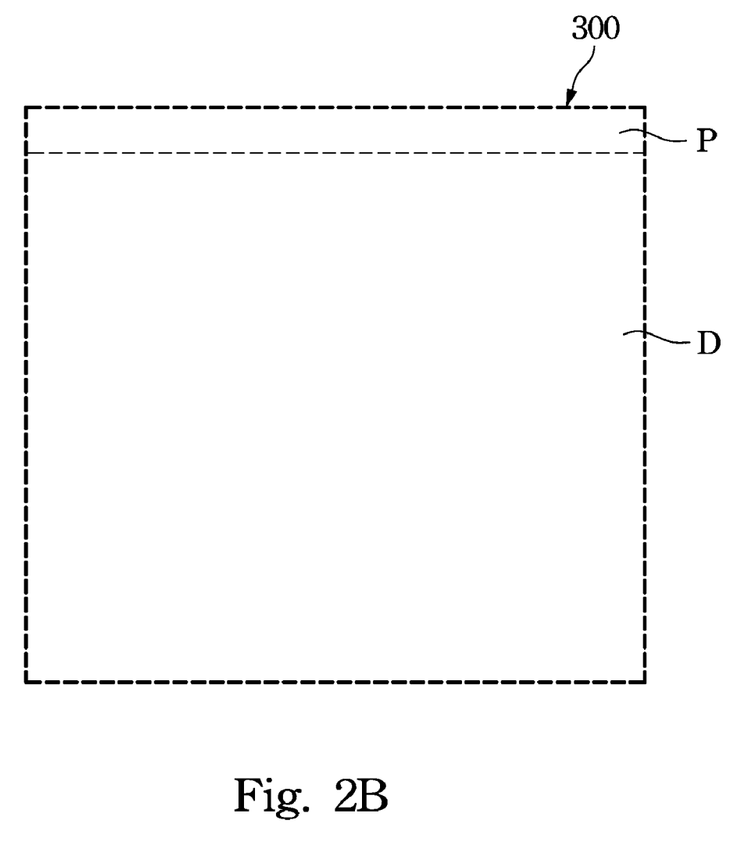
FIG. 2B illustrates a top schematic view of an electrophoretic display panel shown solely in FIG. 2A.
Figure 3:
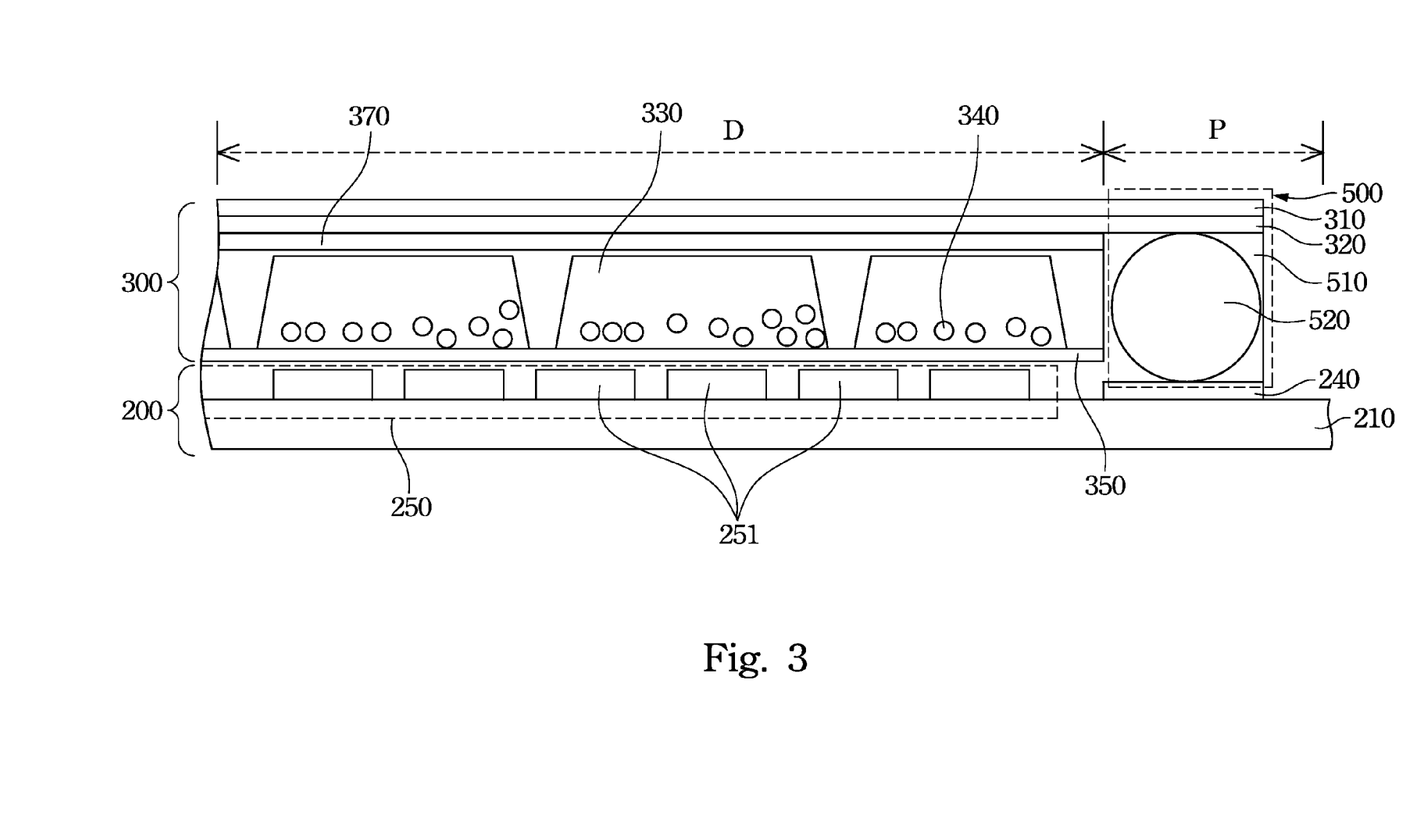
FIG. 3 illustrates a cross-sectional view taken along line 3-3 of FIG. 2A.

Refer to FIG. 2A, FIG. 2B and FIG. 3. FIG. 2A illustrates a top schematic view of an electrophoretic display apparatus of one embodiment of the present invention, FIG. 2B illustrates a top schematic view of an electrophoretic display panel shown solely in FIG. 2A, and FIG. 3 illustrates a cross-sectional view taken along line 3-3 of FIG. 2A.

In this embodiment, the electrophoretic display apparatus 100 includes a driving substrate 200, an electrophoretic display panel 300 and a controller 400 (e.g. a chip, a chip set or a circuit module).

The driving substrate 200 includes a lower substrate 210 (FIG. 3), a gate fanout region 220 (FIG. 2A), a data fanout region 230, a first conductive pad 240 and an electrode region 250 (FIG. 3). The lower substrate 210 can be a plastic substrate, a glass substrate or a substrate made of other types of materials.

The first conductive pad 240, the electrode region 250, the data fanout region 230, the gate fanout region 220 and the controller 400 are all disposed on a same side of the lower substrate 210.

In this embodiment, the data fanout region 230 is disposed between the controller 400 and the electrode region 250, and the gate fanout region 220 is disposed at one side of the electrode region 250, but the configuration of them is not limited in the present invention. In other embodiments not shown in figures, the configurations of the gate fanout region 220 and the data fanout region 230 also can be interchanged with each other.

The first conductive pad 240 is electrically conductive and is positioned at one side of the lower substrate 210 opposite to the controller 400. The electrode region 250 includes a plurality of pixel electrodes 251 (FIG. 3) which are arranged on the lower substrate 210 with an array arrangement.

Both the gate fanout region 220 and the data fanout region 230 are provided with a plurality of conductive wires, and the conductive wires are electrically connected with the controller 400 and the pixel electrodes 251 respectively. Thus, the controller 400 can drive the electrophoretic display panel 300 by the pixel electrodes 251.

The electrophoretic display panel 300 is presented as a rectangle (shown as a bold dotted lined rectangle in FIG. 2A or FIG. 2B), and positioned above the pixel electrodes 251 arranged on one side of the lower substrate 210.

Refer to FIG. 3 again. The electrophoretic display panel 300 sequentially comprises an upper substrate 310, a conductive electrode 320, a dielectric layer 370, a plurality of cups 330, an electrophoretic display material 340 and a adhesive layer 350. Specifically, the conductive electrode 320 is disposed on one side of the upper substrate 310, the dielectric layer 370 is disposed between the cups 330 and the conductive electrode 320, the electrophoretic display material 340 is disposed in the cups 330, the adhesive layer 350 covers the cups 330 so that the electrophoretic display material 340 can be sealed in the cups 330 and prevented from leaking out of the cups 330, and meanwhile the electrophoretic display panel 300 is coupled to the driving substrate 200 by the adhesive layer 350.

The electrophoretic display panel 300 is defined as a peripheral region P (shown as a smaller dotted lined area in FIG. 2B) and a display region D (shown as a larger dotted lined area in FIG. 2B). The driving substrate 200 comprises an effective display area A (shown as a regular dotted lined area in a center of the bold dotted lined rectangle of FIG. 2A) in which the effective display area A disposed correspondingly to the pixel electrodes 251 of the electrode region 250 is served for providing a display content to users.

The peripheral region P is positioned at one side opposite to the controller 400, that is, the display region D is positioned between the controller 400 and the peripheral region P of the electrophoretic display panel 300.

The peripheral region P is a preserved margin that is left on the electrophoretic display panel 300 due to ensure tolerance for pasting or cutting when the electrophoretic display panel 300 is in a cutting process. Exemplarily, a width of the peripheral region P can be anywhere in a range from 1500 mm to 3000 mm, however, the designer can still adjust the size of the peripheral region P in accordance with the realistic needs.

Furthermore, in this embodiment, a single first conductive area 500 is provided in the peripheral region P for achieving the electrical connection between the controller 400 and the electrophoretic display panel 300.

The first conductive area 500 is disposed in the peripheral region P corresponding to the first conductive pad 240, and the size of the first conductive area 500 is smaller than the size of the peripheral region P. In this embodiment, the first conductive area 500 is arranged in a middle of the peripheral region P, however, the designer can still adjust the size and the position of the first conductive area 500 in accordance with the realistic needs.

Specifically, the first conductive area 500 includes the upper substrate 310 and the conductive electrode 320 but the dielectric layer 370, the cups 330, the electrophoretic display material 340 and the adhesive layer 350 (FIG. 3).

A first space 510 is formed between the first conductive pad 240 and the conductive electrode 320 exposed from the first conductive area 500. The first space 510 accommodates a first conductive element 520. Exemplarily, a width of the first space 510 can be in a range from 1000 mm to 2500 mm, a length of the first space 510 can be in a range from 2000 mm to 7500 mm, and a height of the first space 510 can be in a range from 135 mm to 185 mm. Furthermore, the first conductive element 520, for example, can be made of a conductive rubber, a conductive adhesive or a conductive adhesive tape, and electrically connects the conductive electrode 320 and the first conductive pad 240.

However, the designer can still adjust the dimension of the first space 510 and choose the type of the first conductive element 520 in accordance with the realistic needs.

The driving substrate 200 is provided with a first conductive wire 360 (e.g. printed trace or physical cable) on the driving substrate 200 between the controller 400 and the first conductive pad 240, and the first conductive wire 360 is electrically connected with the controller 400 and the first conductive pad 240, so as to further achieve the electrical connection between the controller 400 and the electrophoretic display panel 300.

However, two first conductive wires 360 shown on FIG. 2A are only for illustration, the number of the first conductive wires 360 is not limited, that is, the number of the first conductive wire 360 can be single one, or more than two of the first conductive wires 360.

Figure 4:
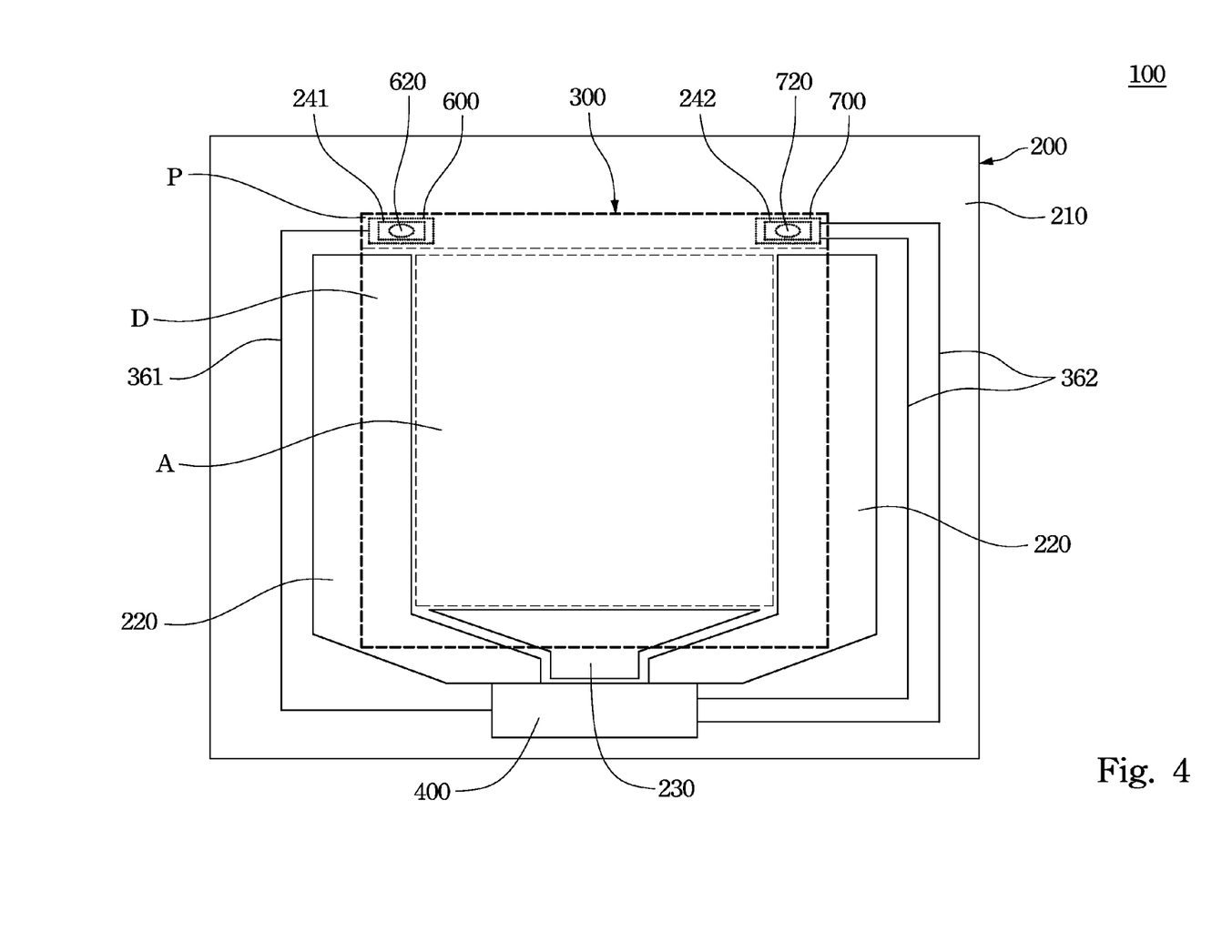
FIG. 4 illustrates a top schematic view of an electrophoretic display apparatus of another embodiment of the present invention.

Refer to FIG. 3 and FIG. 4 in which FIG. 4 illustrates a top schematic view of an electrophoretic display apparatus of another embodiment of the present invention.

In another embodiment, the driving substrate 200 includes a lower substrate 210, two gate fanout regions 220 and a data fanout region 230. In addition, in order to enhance the reliability of the electrical connection between the controller 400 and the electrophoretic display panel 300, in another embodiment, two first conductive areas provided in the peripheral region P are respectively named a first conductive area 600 and a second conductive area 700, and two conductive pads provided on the driving substrate 200 are respectively named a first conductive pad 241 and a second conductive pad 242.

While referring to FIG. 4, the cross-sectional view of each conductive area 600 or 700 in FIG. 4 please also refer to FIG. 3.

The first conductive area 600 and the second conductive area 700 are at two opposite sites in the peripheral region P, and the first conductive area 600 is positioned in the peripheral region P corresponding to the first conductive pad 241, and the second conductive area 700 is positioned in the peripheral region P corresponding to the second conductive pad 242.

Particularly, both the sizes of the first conductive area 600 and the second conductive area 700 are smaller than the size of the peripheral region P. Both the first conductive area 600 and the second conductive area 700 include the upper substrate 310 and the conductive electrode 320 but the dielectric layer 370, the cups 330, the electrophoretic display material 340 and the adhesive layer 350 (refer to FIG. 3).

Thus, a first space (refer to the first space 510 in FIG. 3) is formed between the first conductive pad 241 and the conductive electrode 320 exposed from the first conductive area 600. The first space accommodates a first conductive element 620. A second space (refer to the first space 510 in FIG. 3) is formed between the second conductive pad 242 and the conductive electrode 320 exposed from the second conductive area 700. The second space accommodates a second conductive element 720. Exemplarily, a width of the first space and the second space can be in a range from 1000 mm to 2500 mm, a length of the first space can be in a range from 2000 mm to 7500 mm, and a height of the first space and the second space can be anywhere in a range from 135 mm to 185 mm.

Furthermore, the first conductive element 620 and the second conductive element 720, for example, can be made of a conductive rubber, a conductive adhesive or a conductive adhesive tape. The first conductive element 620 electrically connects the conductive electrode 320 and the corresponding first conducive pad 241; the second conductive element 720 electrically connects the conductive electrode 320 and the corresponding second conducive pad 242

However, the designer can still adjust the dimensions of the first space 510 and the second space, and choose the types of the first conductive element 620 and the second conductive element 720 in accordance with the realistic needs.

Similarly, the driving substrate 200 is provided with a first conductive wire 361 (e.g. a printed trace or a physical cable) on the driving substrate 200 between the controller 400 and the first conductive pad 241, and the first conductive wire 361 is electrically connected with the controller 400 and the first conductive pad 241, so as to further achieve the electrical connection between the controller 400 and the electrophoretic display panel 300.

However, a single first conductive wires 361 shown on FIG. 4 is only for illustration, the number of the first conductive wires 361 is not limited, that is, the number of the first conductive wire 361 can be a plurality of the first conductive wires 360.

Also, the driving substrate 200 is further provided with a second conductive wire 362 (e.g. a printed trace or a physical cable) on the driving substrate 200 between the controller 400 and the second conductive pad 242, and the second conductive wire 362 is electrically connected with the controller 400 and the second conductive pad 242, so as to further achieve the electrical connection between the controller 400 and the electrophoretic display panel 300.

However, two second conductive wires 362 shown on FIG. 4 are only for illustration, the number of the second conductive wires 362 is not limited, that is, the number of the second conductive wire 361 can be only one second conductive wire 362 or more than two of the second conductive wires 362.

Figure 5:
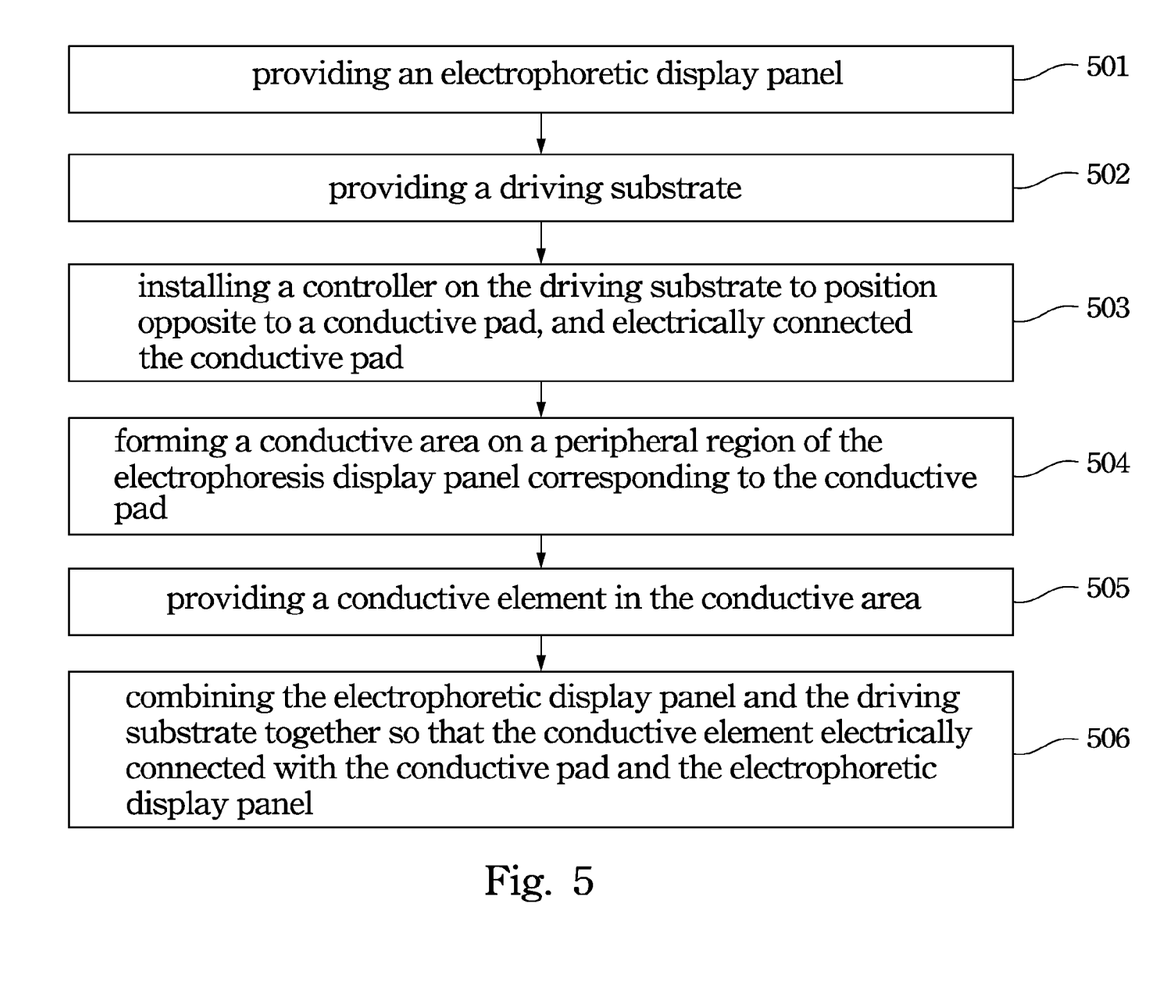
FIG. 5 illustrates a flow chart of a method for manufacturing an electrophoretic display apparatus of the present invention.

Refer to FIG. 2A, and FIG. 5 in which FIG. 5 illustrates a flow chart of a method for manufacturing an electrophoretic display apparatus of the present invention.

In accordance with an embodiment of the present invention, the method for manufacturing the electrophoretic display apparatus 100 includes steps:

In Step (501) providing an electrophoretic display panel 300 as mentioned above;

In Step (502) providing a driving substrate 200 as mentioned above;

In Step (503) installing a controller 400 as mentioned above on the driving substrate 200 so that the controller 400 is positioned at a side opposite to the peripheral region P of the electrophoresis display panel 300, and electrically connected the conductive pad 240;

In Step (504) forming a conductive area 500 as mentioned above on the peripheral region P of the electrophoresis display panel 300 corresponding to the conductive pad 240;

In Step (505) providing a conductive element 520 as mentioned above in the conductive area 500; and In Step (505) combining the electrophoretic display panel 300 and the driving substrate 200 together so that the conductive element 520 is electrically connected with the conductive pad 240 and the conductive electrode 320 as mentioned above, so as to further achieve the electrical connection between the controller 400 and the electrophoretic display panel 300.

In detail of the step (504), it further includes a wiping step of the electrophoretic display panel 300, for example, by machinery to remove or by chemical material (e.g. Ethyl acetate) to solve a part of the adhesive layer 350, a part of the cups 330 and a part of the electrophoretic display material 340 on an expected position of the peripheral region P of the electrophoresis display panel 300, until a part of the conductive electrode 320 is exposed to form a conductive area 500 mentioned above.

To sum up, since the peripheral region of the electrophoresis display panel needs to be preserved anyway when the electrophoresis display panel material is cut, the present invention moves the conductive area to the peripheral region of the electrophoresis display panel, thus, the present invention saves materials of the two protrusion areas and the area between the two protrusion areas of the conventional electrophoretic display panel material mentioned above, so as not only to increase the material utilization ratio after the electrophoretic display panel material is cut, but also prevent from rising the material cost.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An electrophoretic display apparatus, comprising:
    a driving substrate having an effective display area, wherein the driving substrate comprises a plurality of pixel electrodes disposed within the effective display area;
    an electrophoretic display panel disposed over the pixel electrodes of the driving substrate, wherein the electrophoretic display panel includes a peripheral region and a display region;
    a controller disposed on the driving substrate, wherein the controller is positioned at a side opposite to the peripheral region of the electrophoresis display panel, and the display region is positioned between the controller and the peripheral region of the electrophoretic display panel; and
    a first conductive element disposed in the peripheral region of the electrophoretic display panel, and electrically connected the controller and the electrophoretic display panel.

2. The electrophoretic display apparatus as claimed in claim 1, wherein the driving substrate further comprises a first conductive wire electrically connecting with the controller and the first conductive element.

3. The electrophoretic display apparatus as claimed in claim 2, wherein the driving substrate further comprises a first conductive pad disposed correspondingly to the first conductive element, wherein the first conductive pad electrically connects with the first conductive wire.

4. The electrophoretic display apparatus as claimed in claim 3, wherein the electrophoretic display panel comprises a first conductive area arranged in the peripheral region, and the first conductive area comprises an upper substrate and a conductive electrode disposed on the upper substrate.

5. The electrophoretic display apparatus as claimed in claim 4, wherein a first space is formed between the conductive electrode of the first conductive area and the first conductive pad, and the first space accommodates the first conductive element, and the first conductive element electrically connects the first conductive pad and the conductive electrode of the first conductive area.

6. The electrophoretic display apparatus as claimed in claim 5, further comprising a second conductive element, disposed in the peripheral region of the electrophoretic display panel and electrically connected the controller and the electrophoretic display panel;
    wherein the electrophoretic display panel further comprises a second conductive area arranged in the peripheral region of the electrophoretic display panel, and the second conductive area comprises an upper substrate and a conductive electrode disposed on the upper substrate; and
    the driving substrate further comprises a second conductive pad disposed correspondingly to the second conductive element, wherein a second space is formed between the conductive electrode of the second conductive area and the second conductive pad, and the second space accommodates the second conductive element, and the second conductive element electrically connects the second conductive pad and the conductive electrode of the second conductive area.

7. The electrophoretic display apparatus as claimed in claim 6, wherein the first space and the second space are respectively disposed on two opposite sites of the peripheral region of the electrophoretic display panel.

8. The electrophoretic display apparatus as claimed in claim 6, wherein the driving substrate further comprises a second conductive wire electrically connecting with the controller and the second conductive element.

9. The electrophoretic display apparatus as claimed in claim 1, wherein the driving substrate further comprises a plurality of conductive wires electrically connecting with the controller and the first conductive element.

10. The electrophoretic display apparatus as claimed in claim 1, wherein the display region of the electrophoretic display panel comprises:
    an upper substrate;
    a conductive electrode disposed on the upper substrate;
    a plurality of cups respectively arranged on the conductive electrode;
    an electrophoretic display material disposed in the cups; and
    an adhesive layer disposed on the cups to seal the electrophoretic display material.

11. The electrophoretic display apparatus as claimed in claim 1, wherein the first conductive element is a conductive rubber, a conductive adhesive or a conductive adhesive tape.

12. The electrophoretic display apparatus as claimed in claim 1, wherein a width of the peripheral region is in a range from 1500 mm to 3000 mm.

13. The electrophoretic display apparatus as claimed in claim 1, wherein the electrophoretic display panel is in a rectangle.

14. A method for manufacturing an electrophoretic display apparatus, comprising:
    providing an electrophoretic display panel having a peripheral region thereon, wherein the electrophoretic display panel comprises:
        an upper substrate;
        a conductive electrode disposed on the upper substrate;
        a plurality of cups disposed on the conductive electrode;
        an electrophoretic display material disposed in the cups; and
        an adhesive layer disposed on the cups to seal the electrophoretic display material;
    providing a driving substrate, wherein the driving substrate comprises a conductive pad corresponding to the peripheral region of the electrophoretic display panel;
    installing a controller on the driving substrate, wherein the controller is positioned at a side opposite to the peripheral region of the electrophoresis display panel, and electrically connected to the conductive pad;
    forming a conductive area on the peripheral region of the electrophoresis display panel, wherein the conductive area is corresponding to the conductive pad, and is exposed a part of the conductive electrode;
    providing a conductive element in the conductive area; and
    combining the electrophoretic display panel and the driving substrate together so that the conductive element is electrically connected with the conductive pad and the electrophoretic display panel.

15. The method for manufacturing an electrophoretic display apparatus as claimed in claim 14, wherein the step of forming the conductive area comprises:

removing a part of the adhesive layer, a part of the cups and a part of electrophoretic display material in the peripheral region thereof for exposing the part of the conductive electrode.

16. The method for manufacturing an electrophoretic display apparatus as claimed in claim 14, wherein the step of providing the driving substrate further comprises:

arranging a plurality of conductive wires on the driving substrate, and the conductive wires are electrically connected with the controller and the conductive pad.

17. The method for manufacturing an electrophoretic display apparatus as claimed in claim 14, wherein the first conductive element is a conductive rubber, a conductive adhesive or a conductive adhesive tape.

18. The method for manufacturing an electrophoretic display apparatus as claimed in claim 14, wherein the driving substrate has an effective display area, and the display region is disposed between the controller and the peripheral region of the electrophoretic display panel.

* * * * *